United States Patent Office 3,020,311
Patented Feb. 6, 1962

3,020,311
PROCESS FOR PREPARATION OF POLYAMIDE INTERMEDIATES
Samuel C. Temin, Cleveland, Ohio, assignor, by mesne assignments, to Midland-Ross Corporation, Cleveland, Ohio, a corporation of Ohio
No Drawing. Filed Apr. 9, 1958, Ser. No. 727,279
2 Claims. (Cl. 260—518)

This invention relates to the production of valuable polyamide intermediates and, more particularly, to a process for the preparation of 5-(p-acylaminobenzoyl) valeric acids from their corresponding 1-(p-acylaminophenyl) cyclohexenes.

The copending application Serial No. 475,809, filed December 16, 1954, now U.S. Patent Number 2,868,770, describes a valuable fiber-forming polyamide composition derived from 6-(p-aminophenyl) caproic acid. The 6-(p-aminophenyl) caproic acid utilized therein may be prepared by the reduction of 5-(p-acylaminobenzoyl) valeric acids in the manner more fully described in copending application Serial No. 727,281, filed April 9, 1958. In the present invention an improved process is provided for the preparation of 5-(p-acylaminobenzoyl) valeric acids in substantially improved yields by the ozonization of 1-(p-acylaminophenyl) cyclohexenes.

In the literature, the ozonization of 1-(p-acetaminophenyl) cyclohexene, referred to as N-acetyl cyclohexenyl-aniline, is described by Von Braun in Ann. 507, 14–36 [1933]. Von Braun, however, by the process he describes, prepared only the very unstable aldehyde and not the acid. In order to convert the aldehyde into the acid, it is necessary to isolate the aldehyde for subsequent oxidation. Attempts to isolate the aldehyde have proven, due primarily to its instability, cumbersome, laborious, and time consuming. Now, the present invention provides a process whereby it is no longer necessary or desirable to isolate the intermediate product but instead converts directly the intermediate product into the acid.

In accordance with the present invention, 5-(p-acylaminobenzoyl) valeric acids of the formula

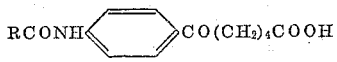

are prepared by reacting 1-(p-acylaminophenyl) cyclohexenes of the formula

with ozone in the presence of water and hydrolyzing the resulting ozonization reaction product to the 5-(p-acylaminobenzoyl) valeric acids. The R in the above 5-(p-acylaminobenzoyl) valeric acid and 1-(p-acylaminophenyl) cyclohexene formulas represents a radical selected from the group consisting of lower alkyl, aryl, alkyl substituted aryl, and cycloalkyl radicals.

In carrying out the process of this invention, the 1-(p-acylaminophenyl) cyclohexene is suspended in an aqueous-solvent medium to which ozone is introduced until the stoichiometric amount is absorbed. The flow of ozone is terminated and oxygen or an oxygen containing gas is passed through the solution while the solution is heated until the hydrolysis is complete. After cooling to ambient temperature, the 5-(p-acylaminobenzoyl) valeric acid may be isolated by such means as filtration and recrystallized to give good yields of substantially pure product.

In the ozonization of olefins as described in the prior art, emphasis is placed upon conducting the reaction at low temperatures and with the olefin dissolved in an anhydrous, completely organic solvent such as, for example, chloroform, methanol, excess olefin, or acetic acid. It was therefore surprising to find that good yields were obtained in carrying out this reaction at temperatures between about 25 to 90° C. and in solvents containing substantial amounts of water. Although the amount of water in the solvent may be varied, it has been found particularly advantageous to use an amount of water at least equal, on a molar basis, to the amount of 1-(p-acylaminophenyl) cyclohexene being ozonized. Substantially greater amounts of water, however, may be present up to about 50% by weight of the solvent with similarly advantageous results.

The concentrations of the reactants may also be varied. For example, the concentration of the 1-(p-acylaminophenyl) cyclohexene in the aqueous solvent can be varied from a concentration totally soluble in the solvent solution to a concentration wherein a substantial amount is not dissolved but within the limits of the mechanical demands for adequate dispersion. Generally, although the concentration of 1-(p-acylaminophenyl) cyclohexene can be varied within wide limits, a concentration at which it is completely soluble affords the best opportunity for its reaction with the ozone and, thus, exhibits particular advantages.

The production of ozone for this reaction is suitably accomplished by means of commercial ozone generating equipment which converts part of the oxygen of a stream of air or pure oxygen fed into it into ozone by means of an electrical discharge. Such a machine as this, manufactured by the Welsbach Corp., and designated as their T-23 Laboratory ozonator was used in providing the ozone in the examples described below. Necessarily, then, the ozone is obtained and, therefore, used in combination with the unconverted oxygen or air as a carrier gas. The concentration of the ozone in the carrier gas may vary from 1% to 10% by weight with particular advantages resulting from using between about 2% and 6% by weight of ozone in the carrier gas.

Although it is not intended to predicate this invention on a theory of the mechanism of the ozone addition to an olefinic bond, it should be pointed out that it is generally believed that ozonization proceeds as follows:

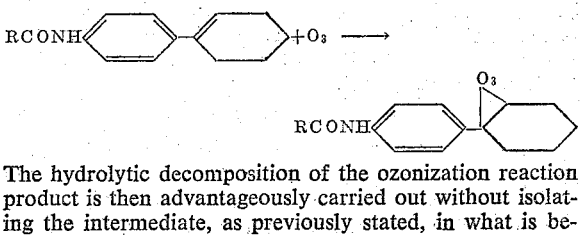

The hydrolytic decomposition of the ozonization reaction product is then advantageously carried out without isolating the intermediate, as previously stated, in what is believed to be the following manner:

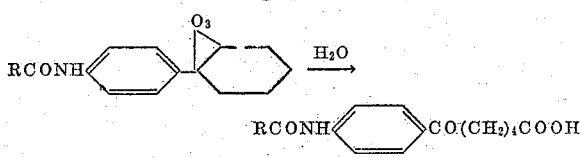

This hydrolytic decomposition can be carried out by heating alone or by heating the reaction mixture in the presence of catalytic amounts of certain metallic ions, such as ferric or manganous ions, or in the presence of hydrogen peroxide. However, greater advantages have been found from carrying out this cleavage by heating the reaction mixture to between about 50° C. to 100° C. in the presence of oxygen. The oxygen need not be pure oxygen but may be the constituent of a gas such as air which is brought into intimate contact with the reaction solution, for example, by being bubbled through the solution until the hydrolysis is complete.

Generally speaking, the starting materials for the process of this invention may be obtained by the acid catalyzed condensation of readily available aniline and cyclohexanone to give derivatives of 1-(4-aminophenyl) cyclohexene. The N-acyl derivatives of 1-(4-aminophenyl) cyclohexene are, of course, employed in this process because the acyl group provides protection for the amino group during the course of the reaction. Any derivative of 1-(4-aminophenyl) cyclohexene can be used which contains a group or radical attached to the amino group which is incapable of reacting with ozone under the conditions employed in the process. Greater advantages, however, result when the radical is selected from the group consisting of alkyl, aryl, arylalkyl, or cycloalkyl radicals. Preferably, for reasons of economy and enhanced solubility, the group designated as R above is a lower alkyl group such as methyl, ethyl, or the like.

This invention will now be more fully described by the following examples, although, it is understood that the invention is not intended to be limited thereby.

*Example I*

The ozone used in this and succeeding examples was generated in a Welsbach T-23 Laboratory ozonator into which pure, anhydrous, oxygen was fed. The concentration of ozone in the exiting oxygen stream was determined by thiosulfate titration of iodine liberated from acidified potassium iodide. The flow rate of gas was determined by a wet meter in the conventional manner. Thus, the time required to deliver the stoichiometric or desired amount of ozone could be readily calculated.

The carrier gas containing 0.045 gram of ozone per liter was led from the ozonator through a glass tube into a cylindrical glass reaction vessel containing a solution of 18.5 g. (0.085 mole) of 1-(p-acetaminophenyl) cyclohexene in 142 cc. of glacial acetic acid and 26 cc. of water for 92 minutes. The temperature of the reaction mass was allowed to rise from 25° to 60° C. during this time. The flow of ozone was terminated and oxygen bubbled through for two hours while the ozonized solution was heated on the steam bath. The solution was allowed to cool to room temperature and then poured, with stirring, into a mixture of crushed ice (250 grams) and water (50 grams). On standing, an off-white solid precipitated and was recovered by filtration. The solid had an M.P. of 190-2°, which was raised to 192-3° by one recrystallization from acetic acid. The yield of 5-(p-acetaminobenzoyl) valeric acid was 17.6 grams or 79% of the theoretical.

*Example II*

A solution of 15.2 g. of 1-(p-acetaminophenyl) cyclohexene (cyclohexenylacetanilide) in a solution of 300 cc. of methanol and 20 cc. of water was treated for 100 minutes with a stream of oxygen containing .0341 g. of ozone per liter at a rate of one liter per minute. To the product was added 30 cc. water and 5 g. acetic acid and the resulting solution refluxed for 3½ hours. The methanol was then distilled off and the residue dissolved in 20% aqueous sodium carbonate solution. The alkaline solution was extracted with ethyl acetate and the aqueous residue was acidified with concentrated hydrochloric acid. The yield of 5-(p-acetaminobenzoyl) valeric acid, M.P. 190-2°, was 45%.

*Example III*

A slurry of 43.8 grams (0.2 mole) of cyclohexenylacetanilide in 200 cc. of acetic acid and 100 cc. of water was rapidly stirred while a stream of oxygen containing .054 gram of ozone per liter was passed in at a rate of one liter per minute for a total of 180 minutes. The temperature during the reaction was 60–70° C. The product was then stirred and heated for 3 hours at 80° while a stream of air was passed through. On standing 37 g. of 4-(p-acetaminobenzoyl) valeric acid separated and was collected on a Buchner funnel. One recrystallization from acetic acid gave a product melting at 191–2° C.

Since it is obvious that many changes and modifications can be made in the above-described details without departing from the nature and spirit of the invention, it is to be understood that the invention is not to be limited thereto except as set forth in the appended claims.

What is claimed is:

1. A process for preparing 5-(p-acylaminobenzoyl) valeric acids of the formula

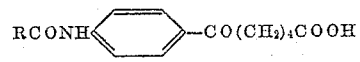

wherein R is a lower alkyl radical, which comprises reacting at between about 25° C. and 90° C. a 1-(p-acylaminophenyl) cyclohexene of the formula

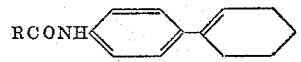

wherein R has the meaning above, with ozone in the presence of an aqueous solvent containing no more than about 50% by weight of water; and subjecting the resulting ozonization reaction product to hydrolysis by heating to between about 50° C. and 100° C. in the presence of oxygen thereby forming said 5-(p-acylaminobenzoyl) valeric acid.

2. A process for preparing 5-(p-acetaminobenzoyl) valeric acid of the formula

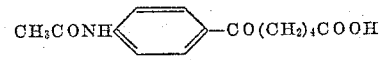

which comprises reacting at between about 25° C. and 90° C. 1-(p-acetaminophenyl) cyclohexene of the formula

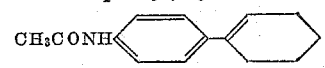

with ozone in the presence of an aqueous solvent containing no more than about 50% by weight of water, and subjecting the resulting ozonization reaction product to hydrolysis by heating to between about 50° C. and 100° C. in the presence of oxygen thereby forming said 5-(p-acetaminobenzoyl) valeric acid.

References Cited in the file of this patent

Braun: Liebigs Annalen 507, pp. 14–36 (1933).
Long: Chem. Reviews 27, pp. 437–493 (1940).
Diaper: Canadian Jour. of Chem. 33, pp. 1720–3 (1955).
Bailey: "Chemical Reviews," vol. 58, No. 5 (October 1958), pp. 989–990.